A-B

C-D

March 13, 1973    J. BALZ    3,720,295
POWER POSITIONING APPARATUS WITH FORCE DEPENDENT SHUT-OFF
Filed Nov. 19, 1971    3 Sheets-Sheet 3

United States Patent Office 3,720,295
Patented Mar. 13, 1973

3,720,295
POWER POSITIONING APPARATUS WITH FORCE DEPENDENT SHUT-OFF
Jurgen Balz, Heilbronn, Germany, assignor to Firma Helmut Balz G.m.b.H., Heilbronn (Neckar), Germany
Filed Nov. 19, 1971, Ser. No. 200,549
Claims priority, application Germany, May 19, 1971, P 21 24 841.9
Int. Cl. F16d 71/00
U.S. Cl. 192—141                                    6 Claims

ABSTRACT OF THE DISCLOSURE

A housing defines therein a chamber through which a motor driven spindle passes which, when an element connected thereto strikes an abutment with predetermined force, causes the motor to shut off. The spindle is held in the housing in axially movable ball bearings which are spread apart by a spring. A sleeve surrounds the spindle, the sleeve having at least one cam thereon. If the spindle is subject to excursion, an axially moving ball bearing (against the force of the spring) will frictionally engage the sleeve, causing its rotation, and the cam to engage a shut off switch.

CROSS REFERENCES

U.S. Pat. 3,616,884; U.S. SN 56,608 now U.S. Pat. 3,647,038; U.S. SN 106,030, now U.S. Pat. 3,700,085; U.S. SN 200,453, filed Nov. 19, 1971.

The present invention relates to power positioning apparatus, having a shut-off which depends on the force with which a positioned element impinges on an abutment, for example, as used to seat valve members against valve seats.

Power-dependent positioning cut-off mechanisms usually include a spindle which is rotated by a motor, the spindle providing axial movement over a transmission element such as a thread, or worm connection. The spindle is journalled in a housing by a pair of ball bearings, the ball bearings fitting in the housing and being axially slidable. Upon axial excursion of the spindle with respect to the housing, or the ball bearings, a frictional engagement between the spindle and an operating member results which causes the operating member to turn with the spindle, the operating member being provided with cams, or other operating members engaging a switch which shuts off the motor driving the positioning apparatus.

Motor drives of this type, particularly to shut off valves (but having other uses besides) are described in the cross referenced patents and applications. The threaded element which causes axial movement is formed as a spindle nut which is rigidly connected to a drive gear, located between the ball bearings. The arrangement is so made that the cylindrical portion of the spindle nut, extending on both sides of the drive gear is formed as an elastic sleeve, having an axial length which is just slightly less than the normal distance between the drive gear and the facing side of the respective ball bearings. A cam-disc is located on each side of the sleeve and the drive gear, the cam-disc being frictionally engaged when the spindle is subject to an axial excursion against the force of a spring, engagement causing rotation of the cam-disc and consequent shut-off of the motor.

In order to provide the same accuracy of shut-off force, with which the element impinges on an obstruction, for example a valve member on a valve seat, the axial play on both sides between the sleeve and the ball bearings must, accurately, be the same. This requires accurate manufacture, with close tolerances.

It is an object of the present invention to provide a power positioning drive with predetermined shut-off force, which is highly accurate, in that the shut-off force can be accurately controlled, and which is simple in construction and reduces the requirement for highly accurate manufacture of parts forming the drive system.

SUBJECT MATTER OF THE PRESENT INVENTION

Briefly, a single sleeve is provided, surrounding the spindle and located between ball bearings retaining the spindle in the housing. The axial length of the single sleeve is just slightly less than the distance between the inner facing edges of the tube ball bearings. The outer surface of the sleeve is formed with, or has secured thereto a cam surface, the cam operating a terminal shut-off switch.

The single sleeve is located on the cylindrical part of the spindle to be freely rotatable with respect thereto. Only a single spindle is required. Thus, the axial play which has to be overcome, and determines in part the shut-off force in both directions of shut-off is always the same, thus providing improved accuracy of shut-off in both terminal directions. The construction further permits simplification in the general layout of parts, and arrangement of the elements, since additional camming discs, and parts penetrating through the walls of the housing (such as switches) can be avoided or more compactly located.

In certain applications it is desirable to combine the final positioning shut-off switch with additional auxiliary switches, for example pumps, which are to be shut off before the actual, final positioning force of the drive is reached. For example, if the mechanism of the present invention is used to shut off a valve, it may be desirable to previously shut off a pump. The arrangement of parts permits placement of more than one shut off switch to be engaged by auxiliary cams, located at various levels within the apparatus itself, the cams being offset with respect to each other to provide different timing of shut-off.

A particularly suitable arrangement requiring but little space and ready accessibility of parts is obtained when the housing is formed as a pair of axially split shells. This provides ready access to the switches. The ball bearings can be seated in cup-shaped bearing bosses, and secured therein to prevent rotation of the ball bearing race contacting the housing bearing cup, or boss, but permitting axial, sliding movement. Such bearing cups can be made as drawn sheet metal portions, providing for simplicity in manufacture and assembly. The drive gear preferably is located beyond the ball bearings, and connected to a motor beyond the location of the ball bearings themselves. The motor can then be located in a suitably formed attachment, or extension of the housing, adjacent that portion of the housing enclosing the switches, so that separation of lubricant and oil from the electrical components can be readily obtained.

The invention will be described by way of example with reference to the accompanying drawings, wherein.

Figure 1:
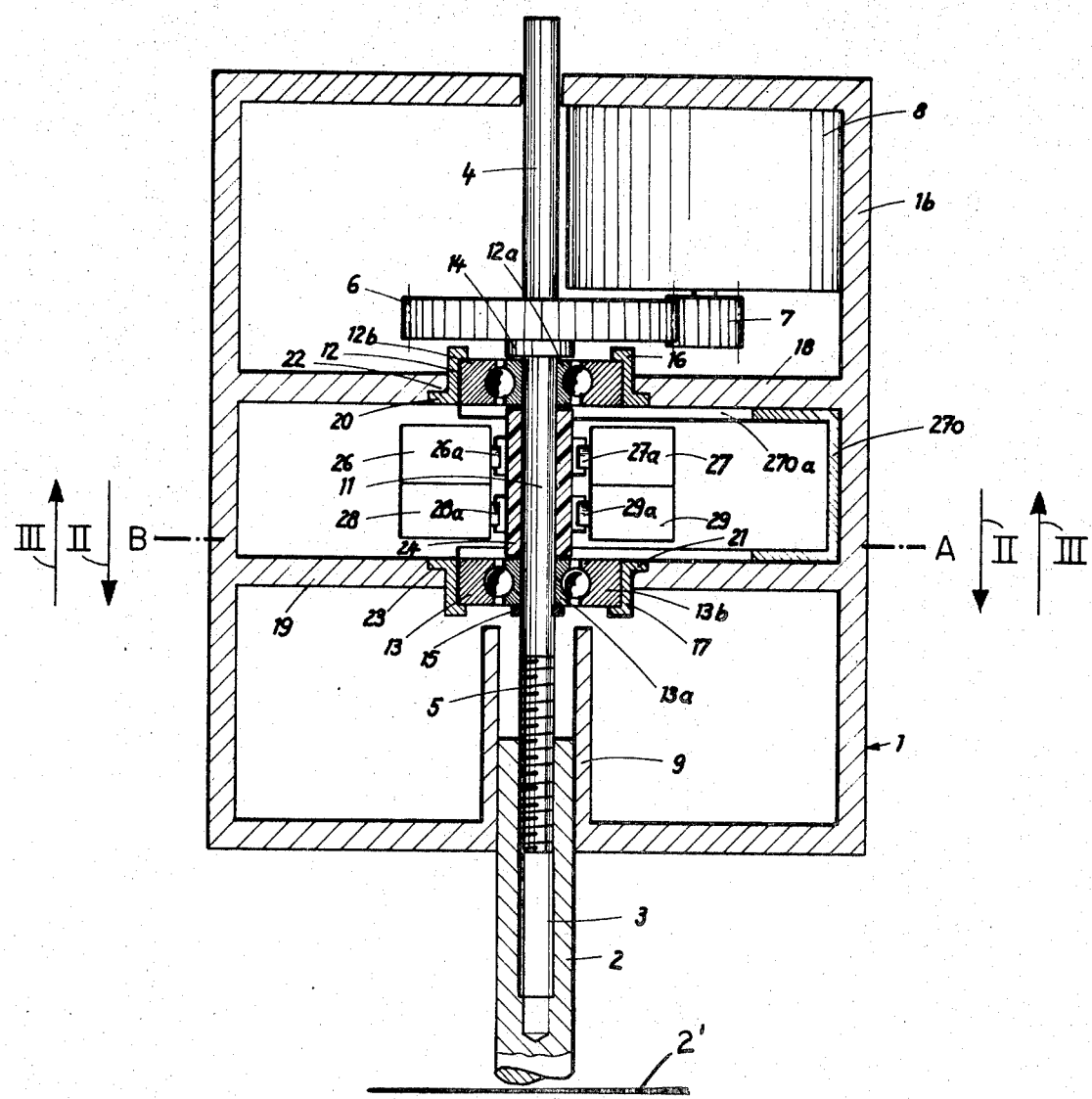
FIG. 1 is an axial longitudinal cross-sectional view, partly schematic, of the drive.

The drive is contained within a housing 1, and includes a shaft or pin 2, which is held non-rotatably in a boss 9 of the housing, by means (not shown) such as a longitudinal guideway. The shaft or pin 2 is internally threaded as seen at 3, and engages threads 5 of a spindle 4. Upon rotation of spindle 4, pin 2 will move axially, for example until an abutment shown schematically at 2' is engaged. Spindle 4 is rigidy connected to a drive gear 6, which engages with a pinion 7 of motor 8, located within the housing 1. Pin 2 is thus interconnected with spindle 4 in such a manner that the pin 2 is axially moved upon rotation of spindle 4. The housing 1 is formed of a pair of half shells 1a, 1b, which may be similar, and which are interconnected by means not specifically shown, such as bolts or the like. The plane of separation 10 (FIGS. 2, 3) passes axially through the center of spindle 4, to provide symmetrical halves.

A pair of ball bearings 12, 13 are located on a cylindrical portion 11 of spindle 4. They are longitudinally slidable towards the inside, being held on the shaft by counter elements 14, 15. The counter bearing element 15 can be a mere C-ring, slipped about the shaft; counter element 14 can be a shoulder or a ring located on spindle 4, or, again, a C-ring. The element 14 is located immediately adjacent drive gear 6.

Figure 4:
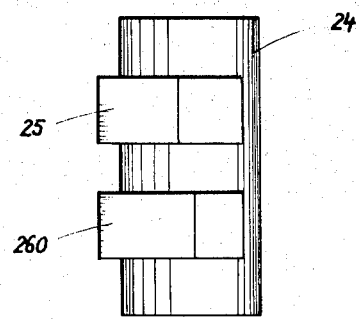
FIG. 4 is a side view of the operating cams and elements, to a greatly enlarged scale.
Figure 5:
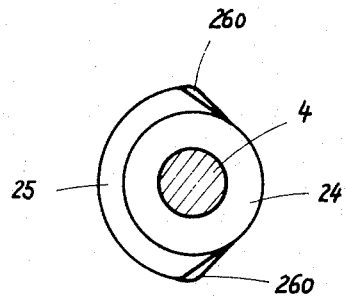
FIG. 5 is a top view of the operating element and cams of FIG. 4.

The two ball bearings 12, 13 are seated in bearing cups 16, 17, formed as drawn sheet metal cups, and secured on parallel transverse walls 18, 19 of the housing. The bearing cups 16, 17 are formed with a projecting ring 20, 21, respectively, which engage a suitably matching depression, or recess 22, 23 formed in the transverse walls 18, 19, respectively. A sleeve 24, for example of reinforced fibers or plasticized material, for example hard plastic, forms the operating unit for the switching mechanism. The axial length of sleeve 24 is just slightly smaller than the distance between the facing end surfaces of the inner races 12a, 13a of the ball bearings 12, 13. Sleeve 24 has a pair of cam segments 25, 260 on its outside (see FIGS. 4 and 5). The first cam segment 25 cooperates with a pair of terminal switches 26, 27, the operating elements of the switches being seen at 26a, 27a; the cam element 260 is located axially displaced from cam 25 and cooperates with a pair of switches 28, 29 having operating members 28a, 29a. As best seen in FIG. 5, the cam segment 25 and cam segment 260 are radially offset with respect to each other, so that, when sleeve 24 turns, switches 28, 29 are operated first by cam segment 260 and, thereafter, switches 26, 27 are engaged by cam element 25.

Figure 2:
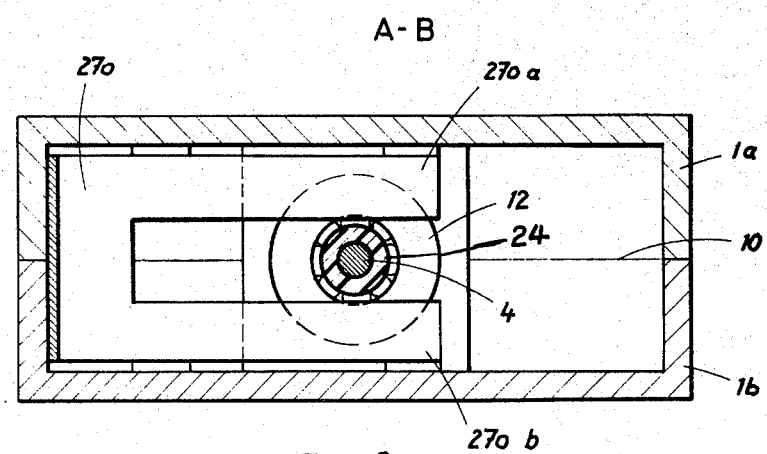
FIG. 2 is a sectional view looking downwardly from line A–B of FIG. 1 in the direction of arrows II—II.
Figure 3:
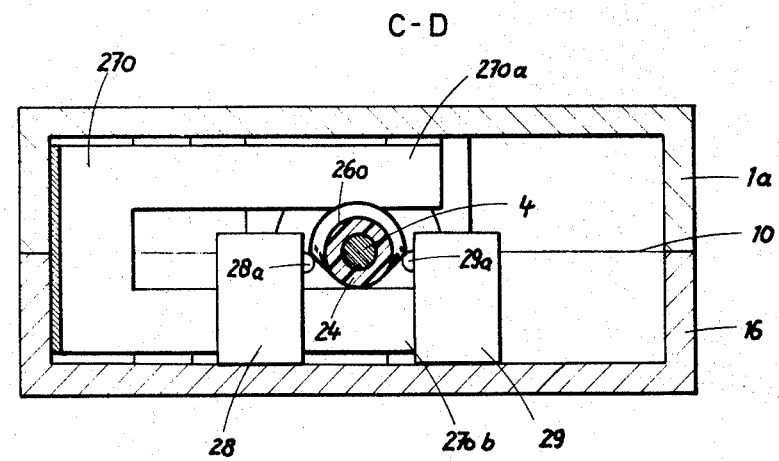
FIG. 3 is a sectional view looking upwardly from line A–B in the direction of arrows III—III of FIG. 1.

A leaf spring 270, generally U-shaped, is located between the two ball bearings 12, 13. The legs of the leaf spring are slit, as best seen in FIGS. 2 and 3, to form a pair of arms 270a, 270b. The spring arms are so arranged that arms 270a, 270b engage the respective outer race 12b, 13b, respectively, of ball bearings 12, 13, and tend to press the outer races into the cup-shaped seats 16, 17 in the housing. The switches 26–29 are located, at least in part, in the space beneath the spring 270, and between the two ball bearings 12, 13. The switches are freely accessible when one of the housing halves 1a, or 1b is removed, as readily seen in FIG. 3.

OPERATION

If pin or shaft 2 engages an obstruction 2', for example when a valve element engages a valve seat, the axial force acting on pin 2 suddenly increases rapidly. This causes spindle 4 to move upwardly. The counter element 15 on spindle 4 carries the ball bearing 13 along, against the force of the spring 270. As a result, the operating element, that is sleeve 24, will be clamped between the inner races 12a, 13a of the ball bearings 12, 13, causing frictional engagement between sleeve 24 and pin 4. Sleeve 24 will now have rotation imparted thereto from spindle 4, and cam segments 25, 270 will engage the operating element of switches 26, 29. The second, auxiliary cam segment 260 is offset radially (see FIGS. 4 and 5) and will first engage switch 28, 29, to disconnect auxiliary circuits, before the final switches 26, 27 are operated by the first cam segment 25.

If the obstruction to pin 2 occurs in the other direction, that is, if a shoulder on pin 2 engages an upward obstruction (such as the valve operating element engaging the inside of a valve housing), then the turn-off mechanism will operate similarly as soon as, due to axial deflection of ball bearing 12, the force acting on spindle 2 exceeds a predetermined value, given by the resiliency of spring 270.

Various changes and modifications may be made within the inventive concept.

I claim:

1. Power positioning apparatus with force-dependent shut-off to position an element (2) against an abutment (2') with predetermined force, comprising
   a housing (1) defining a chamber therein;
   a spindle (4) passing through the housing and adapted to be connected to the element to be positioned with predetermined force against the abutment;
   a motor (8) in driving engagement (6, 7) with said spindle, the spindle being subject to axial excursion when the element impinges on the abutment;
   bearing means (12, 13) axially slidable in the housing and journalling the spindle in the housing;
   spring means (270) holding the bearing means in the housing in axially distanced relationship;
   means (14, 15) secured to the spindle axially engaging the bearing means to move the bearing means axially upon excursion of the spindle;
   a sleeve (24) surrounding the spindle and being just slightly shorter than the distance between the bearing means to permit engagement of the bearing means with the sleeve upon axial excursion of the spindle, and rotation of that sleeve with the spindle by frictional engagement;
   at least one cam means (25, 260) located on the circumference of the sleeve;
   and switch means (26, 27, 28, 29) located to be engaged by said cam means upon rotation of the sleeve when in frictional engagement with a bearing means due to axial excursion of the spindle.

2. Apparatus according to claim 1, wherein the cam means comprises at least two cams (25, 260), axially staggered on the sleeve and having cam surfaces radially offset with respect to each other;
   and the switch means comprises separate switches located to be engaged by the respective cams.

3. Apparatus according to claim 1, wherein the housing comprises an elongated shell which is axially separable at least in the region of the switch means;
   and said switch means are located within the housing between said bearing means and in substantial radial alignment with the cam means on the sleeve.

4. Apparatus according to claim 1, wherein the bearing means (12, 13) comprises ball bearings having an inner and outer race;
   the housing being formed with cup-shaped recesses, the outer races of the ball bearings seating in the respective recesses, and said recesses and outer races being shaped to prevent relative rotation.

5. Apparatus according to claim 4, wherein the spindle means bear against the outer races (12b, 13b) of the ball bearings, the outer races being located in said cup-shaped recesses for axial sliding motion.

6. Apparatus according to claim 1, including a drive gear (6) secured to the spindle (4) to interconnect the spindle with the motor (8), the drive gear being located on the spindle beyond the distance between the bearing means to separate the driving connection and the switch means.

References Cited

UNITED STATES PATENTS

| | | | |
|---|---|---|---|
| 2,407,537 | 9/1946 | Chapman | 192—150 X |
| 3,150,752 | 9/1964 | Baumann | 251—134 X |
| 3,524,526 | 8/1970 | Denkowski | 192—150 X |
| 3,616,884 | 12/1969 | Balz | 192—141 |
| 3,647,038 | 7/1970 | Balz | 192—141 |

FOREIGN PATENTS

| | | | |
|---|---|---|---|
| 1,547,154 | 10/1968 | France | 251—134 |

ALLAN D. HERRMANN, Primary Examiner

U.S. Cl. X.R.

192—142 R, 150; 200—47, 158; 251—134